(12) United States Patent
Zhang

(10) Patent No.: US 8,964,420 B2
(45) Date of Patent: Feb. 24, 2015

(54) ZERO VOLTAGE SWITCHING IN FLYBACK CONVERTERS WITH VARIABLE INPUT VOLTAGES

(75) Inventor: Xiaoyang Zhang, Fremont, CA (US)

(73) Assignee: Apple Inc., Cupertino, CA (US)

( * ) Notice: Subject to any disclaimer, the term of this patent is extended or adjusted under 35 U.S.C. 154(b) by 295 days.

(21) Appl. No.: 13/324,727

(22) Filed: Dec. 13, 2011

(65) Prior Publication Data
US 2013/0148385 A1    Jun. 13, 2013

(51) Int. Cl.
*H02M 3/335*    (2006.01)

(52) U.S. Cl.
USPC .................... 363/21.12; 363/21.14

(58) Field of Classification Search
USPC ......... 363/17–20, 21.03, 21.12, 21.05, 21.14, 363/97, 49, 127, 131, 60, 89; 307/33, 66, 307/80, 77; 323/207, 209, 222, 225, 323/282–288, 299
See application file for complete search history.

(56) References Cited

U.S. PATENT DOCUMENTS

| 5,594,629 | A |   | 1/1997  | Steigerwald |
| 5,608,613 | A |   | 3/1997  | Jansen |
| 5,619,403 | A |   | 4/1997  | Ishikawa et al. |
| 5,757,627 | A |   | 5/1998  | Faulk |
| 5,834,858 | A | * | 11/1998 | Crosman et al. ................. 307/66 |
| 6,069,804 | A |   | 5/2000  | Ingman et al. |
| 6,075,352 | A |   | 6/2000  | Kates et al. |
| 6,084,784 | A | * | 7/2000  | Durbaum ................... 363/21.12 |
| 6,229,717 | B1 |  | 5/2001  | Carral Blanco et al. |
| 6,366,480 | B2 |  | 4/2002  | Hosotani et al. |
| 6,788,555 | B2 | * | 9/2004 | Bourdillon et al. ........ 363/21.14 |
| 6,995,991 | B1 | * | 2/2006 | Yang et al. ................. 363/21.14 |
| 7,061,225 | B2 | * | 6/2006 | Yang et al. ................. 324/103 P |
| 7,362,593 | B2 | * | 4/2008 | Yang et al. ................. 363/21.16 |
| 8,587,151 | B2 | * | 11/2013 | Adest et al. ..................... 307/77 |
| 2007/0103943 | A1 | * | 5/2007 | Mangtani et al. ............... 363/20 |

OTHER PUBLICATIONS

Bucheru, Bogdan T., "ZVS and ZCS High Efficiency Low Profile Adapter".

* cited by examiner

*Primary Examiner* — Rajnikant Patel
(74) *Attorney, Agent, or Firm* — Park, Vaughan, Fleming & Dowler LLP; Chia-Hsin Suen

(57) ABSTRACT

The disclosed embodiments provide a system that operates a flyback converter. During operation, the system senses an input voltage for the flyback converter. Next, the system uses the input voltage to determine a negative peak current that enables zero voltage switching for a primary switch in the flyback converter. Finally, the system uses the negative peak current to perform the zero voltage switching for the primary switch based on the input voltage, wherein the negative peak current reduces a power loss of the flyback converter.

22 Claims, 5 Drawing Sheets

ZERO VOLTAGE SWITCHING IN FLYBACK CONVERTERS WITH VARIABLE INPUT VOLTAGES

BACKGROUND

1. Field

The present embodiments relate to power converters for electronic devices. More specifically, the present embodiments relate to techniques for performing zero voltage switching in flyback converters with variable input voltages.

2. Related Art

Flyback converters may be used to convert alternating current (AC) to direct current (DC) in low-power applications such as mobile phone chargers and/or laptop computer power adaptors. For example, an external power supply (e.g., power brick) for a laptop computer may use a flyback converter to convert AC mains power from a power outlet into low-voltage DC that can be used by components in the laptop computer.

Power losses in a flyback converter may include conduction losses caused by the conduction of current within the components (e.g., transformers, switches, etc.) of the flyback converter, as well as switching losses resulting from the switching of diodes and/or metal-oxide-semiconductor field-effect transistors (MOSFETs) in the flyback converter. Such power losses may reduce the efficiency of the flyback converter, and in turn, generate heat that causes the temperature of the flyback converter to approach and/or exceed the peak operating temperature for the flyback converter. Consequently, power losses in the flyback converter may adversely affect the efficient and/or safe operation of the flyback converter.

To mitigate such power losses, zero voltage switching (ZVS) may be performed in the flyback converter. For example, a ZVS technique may reduce the switching losses of the flyback converter's primary MOSFET by discharging the drain-to-source capacitance of the primary MOSFET before switching the primary MOSFET from an off-state to an on-state. However, ZVS techniques in flyback converters are typically configured for use with only low-line or high-line input voltages.

As a result, ZVS techniques may generate additional power losses if the flyback converters are operated with input voltages for which the ZVS techniques are not configured. For example, low-line ZVS may employ a quasi-resonant (QR) mode that discharges the drain-to-source capacitance of the primary MOSFET without using a negative peak current. On the other hand, high-line ZVS may use a combination of the QR mode with a negative peak current at the secondary MOSFET to discharge the drain-to-source capacitance of the primary MOSFET prior to switching the primary MOSFET. Use of high-line ZVS with a low-line input voltage may thus produce additional current in the flyback converter, which increases the conduction losses within the flyback converter without reducing the switching loss of the primary MOSFET.

Hence, what is needed is a mechanism for efficiently performing ZVS in flyback converters with variable input voltages.

SUMMARY

The disclosed embodiments provide a system that operates a flyback converter. During operation, the system senses an input voltage for the flyback converter. Next, the system uses the input voltage to determine a negative peak current that enables zero voltage switching for a primary switch in the flyback converter. Finally, the system uses the negative peak current to perform the zero voltage switching for the primary switch based on the input voltage, wherein the negative peak current reduces a power loss of the flyback converter.

To sense the input voltage to the flyback converter, the system may measure a voltage on a secondary winding of the flyback converter during an on-state of the primary switch, wherein the measured voltage is proportional to the input voltage.

To determine the negative peak current that enables zero voltage switching in the flyback converter, the system may scale the measured voltage into a reference voltage representing the negative peak current. For example, the system may obtain the reference voltage by scaling down (e.g., dividing) the measured voltage using a voltage divider.

To perform the zero voltage switching for the primary switch based on the input voltage, the system may modify a secondary gate signal for a secondary switch in the flyback converter based on the reference voltage. For example, the system may use a pulse-width modulation (PWM) technique to generate the secondary gate signal from the reference voltage and a sawtooth waveform. The PWM may be performed by a comparator that maintains a high state for the secondary gate signal while the reference voltage is higher than the voltage of the sawtooth waveform. Once the voltage of the sawtooth waveform reaches the reference voltage, the comparator may terminate the secondary gate signal to output a low state for the secondary gate signal.

In some embodiments, the primary switch comprises a metal-oxide-semiconductor field-effect transistor (MOSFET).

In some embodiments, the input voltage is a low-line voltage or a high-line voltage.

In some embodiments, the negative peak current is zero for the low-line voltage, and the negative peak current is nonzero for the high-line voltage.

In some embodiments, the negative peak current reduces the power loss of the flyback converter by reducing at least one of a switching loss of the primary switch and a conduction loss associated with the flyback converter.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
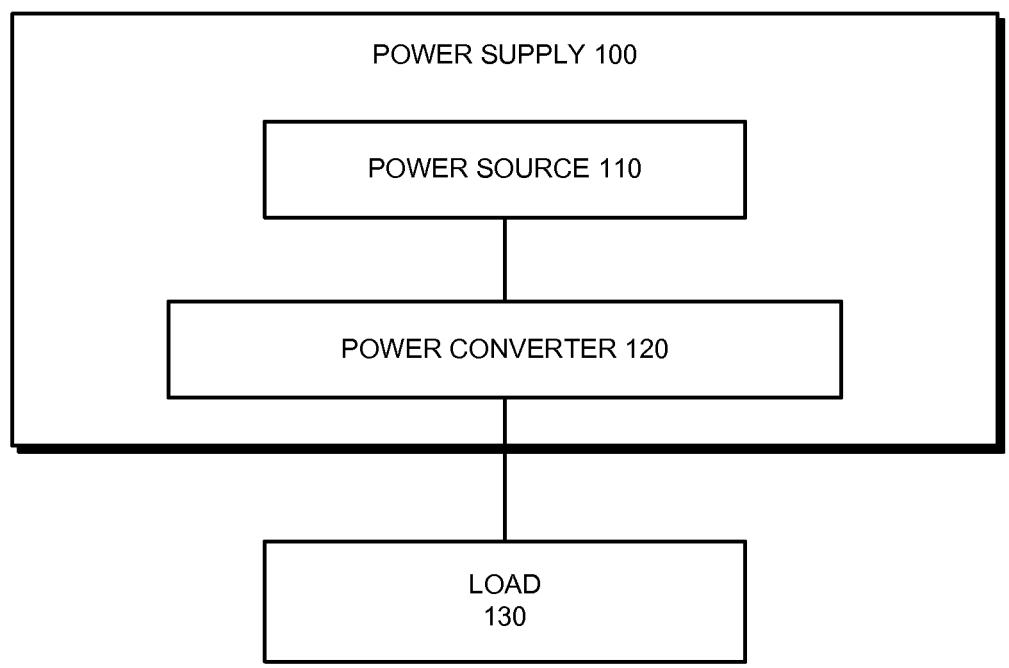
FIG. 1 shows a power supply for an electronic device in accordance with an embodiment.

The disclosed embodiments provide a power supply for an electronic device. As shown in FIG. 1, the power supply 100 includes a power source 110 and a power converter 120. Power converter 120 may obtain an input voltage from power source 110 and convert the input voltage into an output voltage that is used to drive a load 130. For example, power converter 120 may convert alternating current (AC) mains power into low-voltage direct current (DC) that is used to charge a battery and/or power components of a portable electronic device such as a mobile phone, laptop computer, portable media player, and/or tablet computer.

Furthermore, power supply 100 may be designed to accommodate size constraints associated with load 130. For example, the small form factor of a portable electronic device corresponding to load 130 may require the design of a similarly small power supply 100 for use with the portable electronic device. Moreover, gradual reductions in the size and/or weight of the portable electronic device over time may be accompanied by corresponding reductions in the size and/or weight of power supply 100 to further improve the portability of the portable electronic device.

Conversely, such size constraints may result in power losses that reduce the efficiency and/or increase the temperature of power supply 100. In particular, power conversion in power supply 100 may involve a tradeoff between size and efficiency, in which larger electronic components (e.g., transformers, inductors, etc.) may generate a given output voltage at a lower switching frequency, and thus dissipate less power, than smaller electronic components. Because a small form factor for power supply 100 may require the use of small electronic components within power converter 120, power supply 100 may be associated with higher switching losses than a power supply with larger electronic components.

The switching losses may then be dissipated as heat, causing the temperature of power supply 100 to increase. At the same time, the smaller size of power supply 100 may limit heat dissipation through the surface of power supply 100. Consequently, continuing reductions in the size of power supply 100 may cause the temperature of power supply 100 to approach or exceed the peak operating temperature for power supply 100, thus interfering with the safe and/or efficient operation of power supply 100.

In one or more embodiments, power supply 100 includes functionality to reduce power losses in power converter 120. As discussed in further detail below with respect to FIG. 2, power converter 120 may include a flyback converter with a transformer, a primary switch, and a secondary switch. A measurement circuit in power supply 100 may sense an input voltage for the flyback converter (e.g., from power source 110), and a control circuit in power supply 100 may use the input voltage to determine a negative peak current that enables zero voltage switching (ZVS) for the primary switch. The control circuit may then use the negative peak current to perform the ZVS for the primary switch based on the input voltage. In other words, power supply 100 may reduce power losses in the flyback converter by performing ZVS for any input voltage supported by power supply 100, including low-line and high-line voltages.

Figure 2:
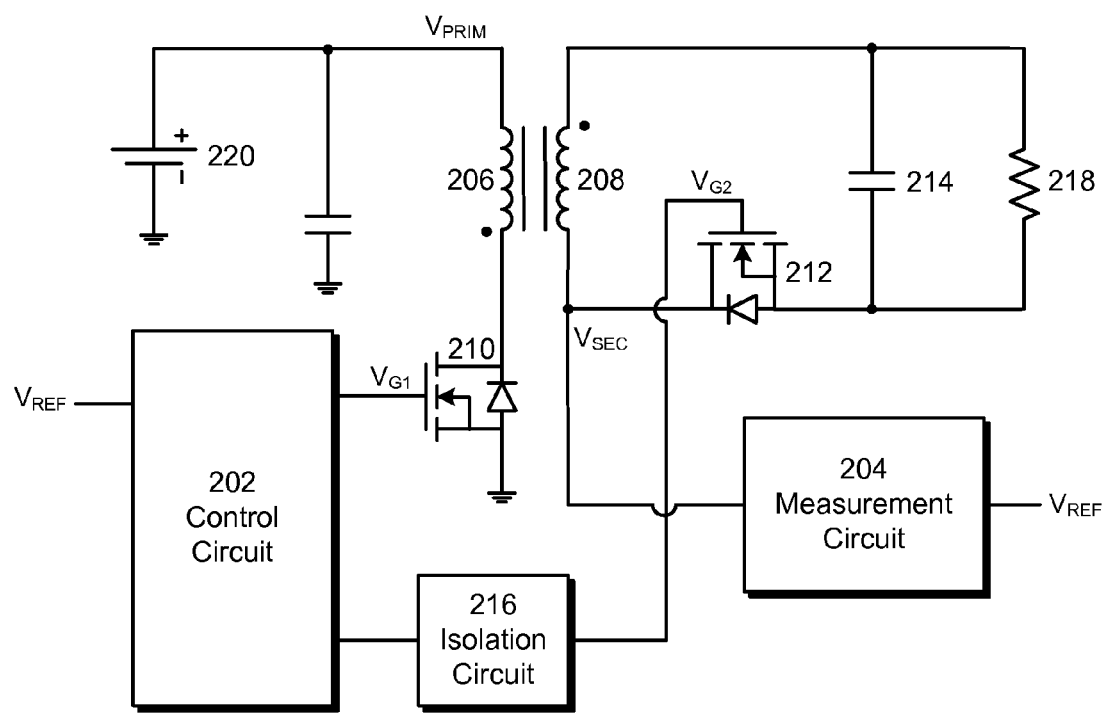
FIG. 2 shows a system for operating a flyback converter in accordance with an embodiment.

FIG. 2 shows a system for operating a flyback converter in accordance with an embodiment. As shown in FIG. 2, a primary input voltage (e.g., "$V_{PRIM}$") is supplied from a power source 220. For example, the input voltage may be obtained as AC mains power from a power outlet. The input voltage may be converted into a secondary output voltage (e.g., "$V_{SEC}$") by the flyback converter, which contains a primary winding 206, a secondary winding 208, a primary switch 210, and a secondary switch 212. Primary winding 206 and secondary winding 208 may form a transformer, and switches 210-212 may correspond to metal-oxide-semiconductor field-effect transistors (MOSFETs).

In particular, a control circuit 202 may charge the flyback converter by opening primary switch 210 and closing secondary switch 212. For example, control circuit 202 may toggle the MOSFET corresponding to primary switch 210 from an off-state to an on-state to couple primary winding 206 to power source 220. At the same time, control circuit 202 may toggle the MOSFET corresponding to secondary switch 212 from an on-state to an off-state to decouple secondary winding 208 from a resistive load 218 connected to the flyback converter. The varying current in primary winding 206 may create a varying magnetic flux in the transformer, resulting in a varying voltage (e.g., "$V_{SEC}$") in secondary winding 208.

Control circuit 202 may then discharge the flyback converter by closing primary switch 210 and opening secondary switch 212. For example, control circuit 202 may toggle the MOSFET corresponding to primary switch 210 from the on-state to the off-state and the MOSFET corresponding to secondary switch 212 from the off-state to the on-state. Once secondary switch 212 is opened, current from secondary winding 208 may be collected by a capacitor 214, which supplies the current to load 218 and acts as a low-pass filter by reducing voltage ripple caused by fluctuating current through secondary winding 208.

To repeatedly charge and discharge the transformer, control circuit 202 may generate a primary gate signal (e.g., "$V_{G1}$") that continuously toggles primary switch 210 between an on-state and an off-state. Similarly, control circuit 202 may use an isolation circuit 216 to generate a secondary gate signal (e.g., "$V_{G2}$") that continuously toggles secondary switch 212 between an on-state and an off-state. Alternatively, secondary switch 212 may be self-driven from secondary winding 208, thus precluding the need for isolation circuit 216 in the system. Furthermore, the secondary gate signal may be out of phase with the primary gate signal, such that secondary switch 212 is in an on-state when primary switch 210 is in an off-state and in an off-state when primary switch 210 is in an on-state. Primary and secondary gate signals are discussed in further detail below with respect to FIG. 3.

Those skilled in the art will appreciate that the operation of the flyback converter may be associated with power losses. First, the toggling of primary and secondary switches 210-212 may result in switching losses if the drain-to-source voltages of switches 210-212 are nonzero. For example, the turn-on switching loss of primary switch 210 may be proportional to $CV^2$, where C represents the drain-to-source capacitance of primary switch 210 and V represents the drain-to-source voltage of primary switch 210. In addition, such switching losses may vary based on the input voltage for the flyback converter, which affects the drain-to-source voltage of primary switch 210, as well as the operating frequency of the flyback converter, which affects the amount of switching in switches 210-212 and thus the rate at which switching losses are incurred in the flyback converter.

Second, conduction losses may be caused by the flow of current through primary and secondary windings 206-208 and switches 210-212. For example, the conduction loss associated with a component in the flyback converter may be equal to $I^2R$, where I represents the current flowing through the component and R represents the resistance of the component to the current. As a result, the conduction losses may increase relative to the switching losses at low operating frequencies and decrease relative to the switching losses at high operating frequencies.

In one or more embodiments, the system of FIG. 2 includes functionality to reduce both conduction and switching losses in the flyback converter by performing ZVS for primary switch 210 with a variety of input voltages for the flyback converter. First, a measurement circuit 204 may measure the voltage on secondary winding 208 (e.g., "$V_{SEC}$") during an on-state of primary switch 210 (e.g., charging of the transformer). Because the voltage on secondary winding 208 is proportional to the input voltage (e.g., by a turns ratio between primary winding 206 and secondary winding 208), the measured voltage may be used by measurement circuit 204 to "sense" the input voltage.

Next, measurement circuit 204 and/or control circuit 202 may use the input voltage to determine a negative peak current that enables ZVS for primary switch 210 and use the negative peak current to perform the ZVS for primary switch 210. For example, control circuit 202 may calculate the negative peak current from the input voltage and use the negative peak current to discharge the drain-to-source capacitance of primary switch 210 prior to toggling primary switch 210 from an off-state to an on-state.

To determine the negative peak current, measurement circuit 204 and/or control circuit 202 may scale the measured voltage into a reference voltage (e.g., "$V_{REF}$") representing the negative peak current. For example, measurement circuit 204 and/or control circuit 202 may include an inverting operational amplifier that obtains the reference voltage by scaling down (e.g., dividing) the measured voltage from secondary winding 208.

Control circuit 202 may then perform the ZVS by modifying the secondary gate signal for secondary switch 212 based on the reference voltage. For example, control circuit 202 may use a pulse-width modulation (PWM) technique to generate the secondary gate signal from the reference voltage and a sawtooth waveform. The PWM may be performed by a comparator that maintains a high state for the secondary gate signal while the reference voltage is higher than the voltage of the sawtooth waveform. Once the voltage of the sawtooth waveform reaches the reference voltage, the comparator may terminate the secondary gate signal to output a low state for the secondary gate signal. The high state may be used to keep secondary switch 212 in an on-state that ramps down the current in secondary winding 208, while the low state may toggle secondary switch 212 to an off-state that prevents the flow of current in secondary winding 208. As a result, control circuit 202 may increase the negative peak current for higher values of the reference voltage and/or input voltage by increasing the duty cycle of the secondary gate signal, and reduce the negative peak current for lower values of the reference voltage and/or input voltage by reducing the duty cycle of the secondary gate signal.

In one or more embodiments, the input voltage is a low-line voltage or a high-line voltage. For example, the system of FIG. 2 may be configured to operate with a low-line voltage of 90-120 VAC and a high-line voltage of 200-240 VAC. Measurement circuit 204 and/or control circuit 202 may identify the input voltage as low-line or high-line and adjust the negative peak current of the flyback converter accordingly. For example, control circuit 202 may use a negative peak current of zero (e.g., no negative peak current) for the low-line voltage because the drain-to-source capacitance of primary switch 210 may be discharged during a quasi-resonant (QR) period of the flyback converter (e.g., operating in discontinuous mode) at lower input voltages. To omit the negative peak current, control circuit 202 may scale the reference voltage to zero, thus precluding the increase in duty cycle of the secondary gate signal. The omission of a negative peak current at the low-line voltage may also avert conduction losses caused by unnecessarily applying high-line ZVS (e.g., nonzero negative peak currents) to the low-line voltage. On the other hand, control circuit 202 may use a nonzero negative peak current for the high-line voltage because the drain-to-source capacitance of primary switch 210 cannot be fully discharged by QR flyback at higher input voltages.

By performing ZVS for a variety of input voltages, the system of FIG. 2 may reduce power losses in the flyback converter and mitigate heat buildup caused by the power losses. The reduced temperature of the flyback converter may additionally enable the use of smaller electronic components (e.g., primary winding 206, secondary winding 208) in the flyback converter, thus facilitating use of the flyback converter in a power supply for a portable electronic device.

Those skilled in the art will appreciate that the system of FIG. 2 may be implemented in a variety of ways. For example, components in control circuit 202 and/or measurement circuit 204 may be provided by a single application-specific integrated circuit (ASIC). Alternatively, control circuit 202 and/or measurement circuit 204 may utilize other combinations of integrated and discrete components. Along the same lines, control circuit 202 and/or measurement circuit 204 may be implemented as analog and/or digital circuits based on design requirements associated with the size, operating frequency, operating temperature, and/or efficiency of the power supply. Finally, control circuit 202 and/or measurement circuit 204 may be configured to perform ZVS with input voltages outside of the low-line and high-line voltage ranges.

Figure 3:
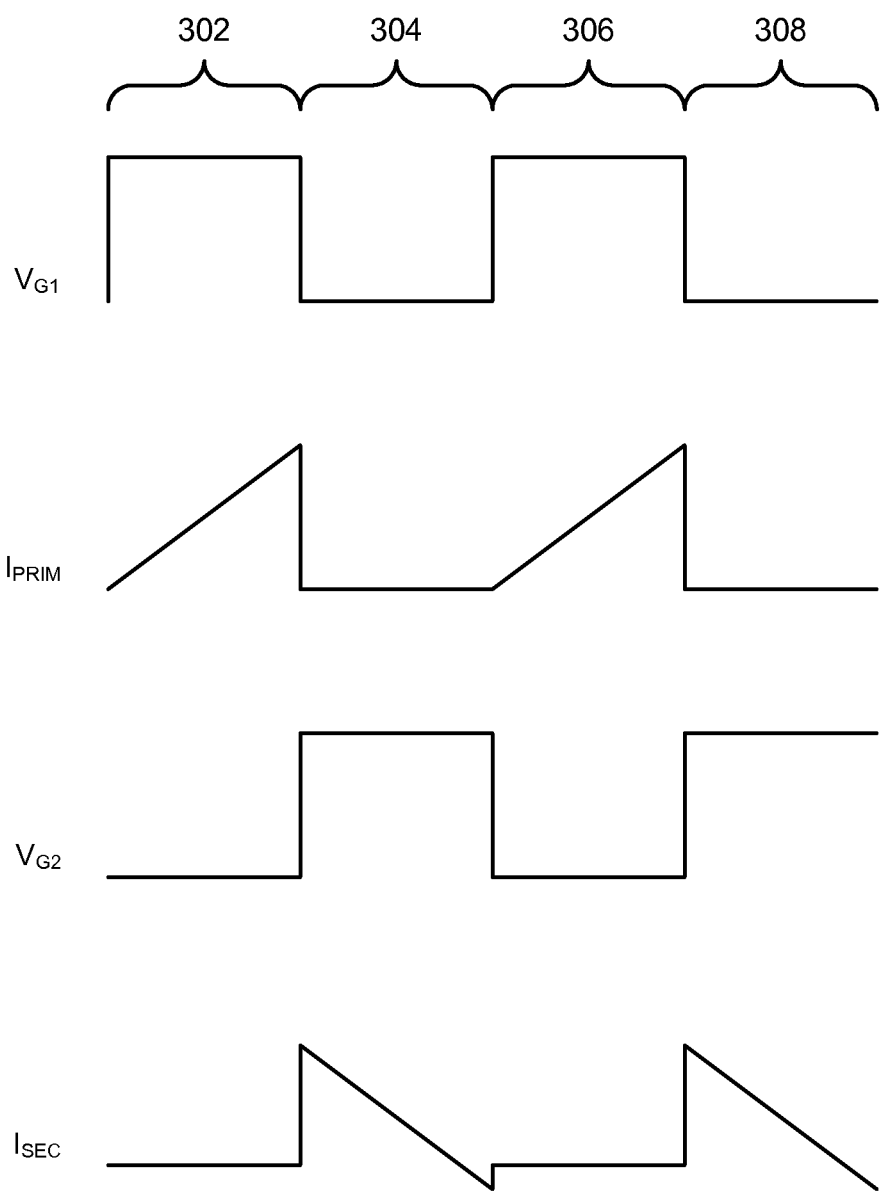
FIG. 3 shows a set of voltages and currents in accordance with an embodiment.

FIG. 3 shows a set of voltages and currents in accordance with an embodiment. The voltages include a first gate voltage (e.g., "$V_{G1}$") associated with a primary switch (e.g., primary switch 210 of FIG. 2) of a flyback converter and a second gate voltage (e.g., "$V_{G2}$") associated with a secondary switch (e.g., secondary switch of FIG. 2) of the flyback converter. In other words, the first and second gate voltages may represent primary and secondary gate signals for MOSFETS corresponding to the primary and secondary switches, respectively. Along the same lines, the currents include a primary current (e.g., "$I_{PRIM}$") associated with a primary winding (e.g., primary winding 206 of FIG. 2) of the flyback converter and a secondary current (e.g., "$I_{SEC}$") associated with a secondary winding (e.g., secondary winding 208 of FIG. 2) of the flyback converter.

During a first switching cycle 302, the primary switch is placed in an on-state by a high state of the first gate voltage. During the on-state of the primary switch, the primary winding is coupled to a power source, and primary current in the primary winding ramps up. On the other hand, the second gate voltage is in a low state, thus placing the secondary switch in an off-state and preventing secondary current from flowing in the secondary winding.

During a second switching cycle 304, the primary switch is toggled to an off-state by a low state of the first gate voltage, while the secondary switch is toggled to an on-state by a high state of the second gate voltage. As a result, primary current ceases to flow in the primary winding, while secondary current in the secondary winding ramps down. Moreover, the high state of the second gate voltage may be maintained so that the current in the secondary winding reaches a peak negative current at the end of switching cycle 304. As discussed above, the peak negative current may be used to discharge the drain-to-source capacitance of the primary switch so that ZVS in the primary switch may be performed with a high-line input voltage. Conversely, the high state of the second gate voltage may terminate once the secondary current reaches zero because a nonzero peak negative current is not necessary for ZVS in the primary switch with a low-line input voltage.

The toggling of the primary and secondary switches and the flow of current in the primary and secondary windings may then be repeated in switching cycles 306-308 and/or additional switching cycles of the flyback converter. For example, the alternating on- and off-states of the primary and secondary switches and ramping up and down of the primary and secondary currents may occur at a high frequency (e.g., 40-200 KHz) during the use of the flyback converter in supplying power to a portable electronic device.

Figure 4:
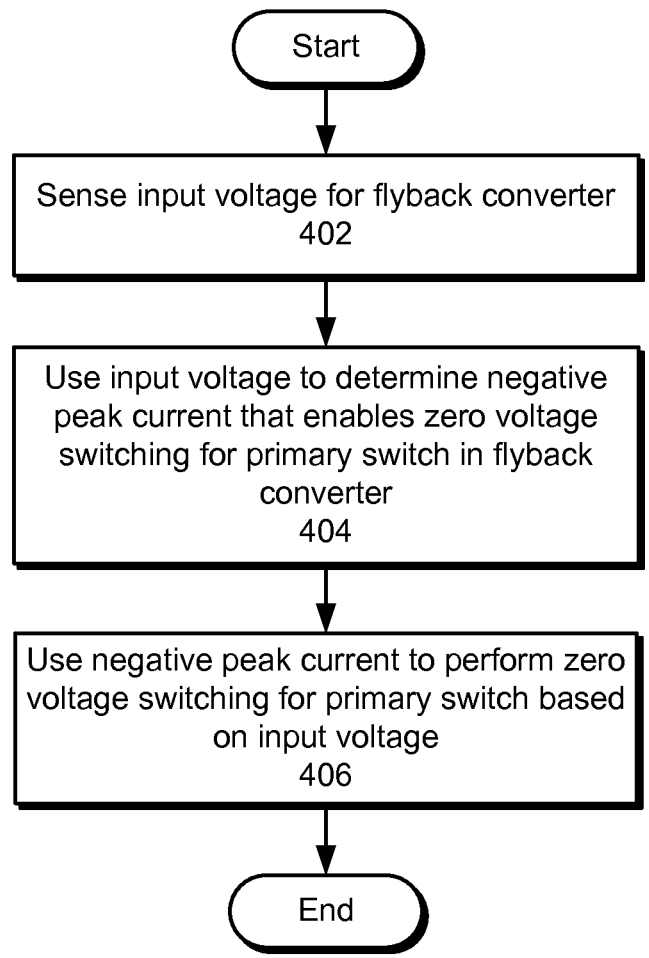
FIG. 4 shows a flowchart illustrating the process of operating a flyback converter in accordance with an embodiment.

FIG. 4 shows a flowchart illustrating the process of operating a flyback converter in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

First, an input voltage for the flyback converter is sensed (operation 402). To sense the input voltage, a voltage on a secondary winding of the flyback converter is measured during an on-state of a primary switch in the flyback converter. Because the measured voltage is proportional to the input voltage (e.g., by a turns ratio of a transformer containing the secondary winding), the measured voltage may be indicative of the input voltage.

Next, the input voltage is used to determine a negative peak current that enables ZVS for the primary switch (operation 404). To determine the negative peak current, the measured voltage may be scaled into a reference voltage representing the negative peak current. For example, the measured voltage may be scaled down using a voltage divider.

Finally, the negative peak current is used to perform ZVS for the primary switch based on the input voltage (operation 406). The ZVS may be performed by modifying a secondary gate signal for a secondary switch in the flyback converter based on the reference voltage. Because the negative peak current is based on the input voltage, the negative peak current may reduce power losses in the flyback converter, including switching losses in the primary switch, as well as conduction losses caused by unnecessary use of nonzero negative peak currents during ZVS (e.g., with low-line voltages).

Figure 5:
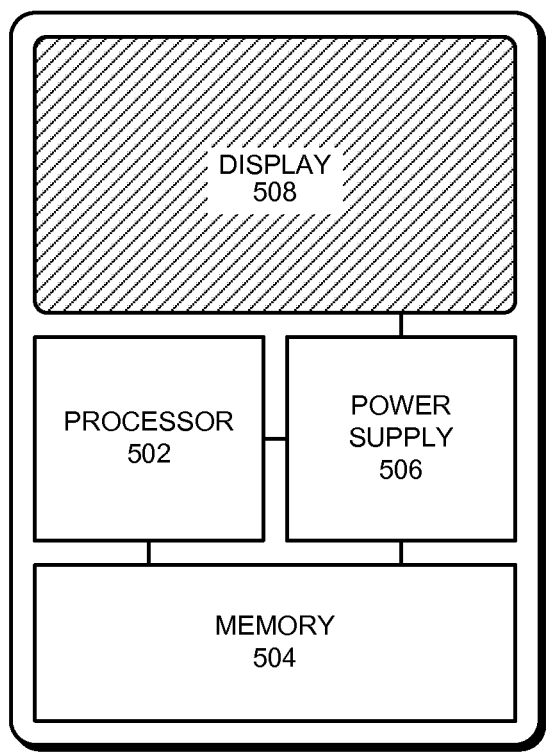
FIG. 5 shows a portable electronic device in accordance with an embodiment.

The above-described flyback converter can generally be used in any type of electronic device. For example, FIG. 5 illustrates a portable electronic device 500 which includes a processor 502, a memory 504 and a display 508, which are all powered by a power supply 506. Portable electronic device 500 may correspond to a laptop computer, tablet computer, mobile phone, PDA, portable media player, digital camera, and/or other type of battery-powered electronic device. Power supply 506 may include a flyback converter that contains a transformer, a primary switch, and a secondary switch. Power supply 506 may also include a measurement circuit that senses an input voltage for the flyback converter. Finally, power supply 506 may include a control circuit that uses the input voltage to determine a negative peak current that enables ZVS for the primary switch. The control circuit may also use the negative peak current to perform the ZVS for the primary switch based on the input voltage to reduce a power loss of the flyback converter.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for operating a flyback converter, comprising:
   measuring an input voltage for the flyback converter by measuring a voltage on a secondary winding of the flyback converter during an on state of a primary switch in the flyback converter that causes current to flow through a primary winding of the flyback converter;
   scaling the measured voltage to form a reference voltage representing a negative peak current in the secondary winding; and
   using the negative peak current indicated by the reference voltage to perform zero voltage switching for the primary switch based on the input voltage, wherein the zero voltage switching is performed by toggling off a secondary switch that causes current to flow through the secondary winding of the flyback converter and toggling on the primary switch based on the indicated negative peak current.

2. The method of claim 1,
   wherein the measured voltage is proportional to the input voltage.

3. The method of claim 1, wherein using the negative peak secondary current to perform the zero voltage switching for the primary switch based on the input voltage involves:
   modifying a secondary gate signal for the secondary switch based on the reference voltage.

4. The method of claim 1, wherein the primary switch and the secondary switch comprises a metal-oxide-semiconductor field-effect transistors (MOSFETs).

5. The method of claim 1, wherein the input voltage is a low-line voltage or a high-line voltage.

6. The method of claim 5,
   wherein the negative peak current is zero for the low-line voltage, and
   wherein the negative peak current is nonzero for the high-line voltage.

7. The method of claim 1, wherein the negative peak current reduces the power loss of the flyback converter by reducing at least one of:
   a switching loss of the primary switch; and
   a conduction loss associated with the flyback converter.

8. A system for operating a flyback converter, comprising:
   a measurement circuit configured to measure an input voltage for the flyback converter by measuring a voltage on a secondary winding of the flyback converter during an on state of a primary switch in the flyback converter that causes current to flow through a primary winding of the flyback converter; and
   a control circuit configured to:
      scale the measured voltage to form a reference voltage representing a negative peak current in the secondary winding; and
      use the negative peak current indicated by the reference voltage to perform zero voltage switching for the primary switch based on the input voltage, wherein the zero voltage switching is performed by toggling off a secondary switch that causes current to flow through the secondary winding of the flyback converter and toggling on the primary switch based on the indicated negative peak current.

9. The system of claim 8,
   wherein the measured voltage is proportional to the input voltage.

10. The system of claim 8, wherein using the negative peak current to perform the zero voltage switching for the primary switch based on the input voltage involves:
   modifying a secondary gate signal for the secondary switch based on the reference voltage.

11. The system of claim 8, wherein the flyback converter is associated with a power supply for a portable electronic device.

12. The system of claim 8, wherein the input voltage is a low-line voltage or a high-line voltage.

13. The system of claim 12,
   wherein the negative peak current is zero for the low-line voltage, and
   wherein the negative peak current is nonzero for the high-line voltage.

14. The system of claim 8, wherein the negative peak current reduces the power loss of the flyback converter by reducing at least one of:
   a switching loss of the primary switch; and
   a conduction loss associated with the flyback converter.

15. A power supply, comprising:
   a flyback converter, comprising:
      a transformer;
      a primary switch; and
      a secondary switch;
   a measurement circuit configured to measure an input voltage for the flyback converter by measuring a voltage on a secondary winding of the flyback converter during an on state of a primary switch in the flyback converter that causes current to flow through a primary winding of the flyback converter; and
   a control circuit configured to:
      scale the measured voltage to form a reference voltage representing a negative peak current in the secondary winding; and
      use the negative peak current indicated by the reference voltage to perform zero voltage switching for the primary switch based on the input voltage, wherein the zero voltage switching is performed by toggling off a secondary switch that causes current to flow through a secondary winding of the flyback converter and toggling on the primary switch based on the indicated negative peak current.

16. The power supply of claim 15,
   wherein the measured voltage is proportional to the input voltage.

17. The power supply of claim 15, wherein using the negative peak current to perform the zero voltage switching for the primary switch based on the input voltage involves:
   modifying a secondary gate signal for the secondary switch based on the reference voltage.

18. The power supply of claim 15, wherein the primary switch and the secondary switch correspond to metal-oxide-semiconductor field-effect transistors (MOSFETs).

19. The power supply of claim 15, wherein the input voltage is a low-line voltage or a high-line voltage.

20. The power supply of claim 19,
   wherein the negative peak current is zero for the low-line voltage, and
   wherein the negative peak current is nonzero for the high-line voltage.

21. The power supply of claim 15, wherein the negative peak current reduces the power loss of the flyback converter by reducing at least one of:
   a switching loss of the primary switch; and
   a conduction loss associated with the flyback converter.

22. The power supply of claim 15, wherein the power supply is configured to supply power to a portable electronic device.

* * * * *